UNITED STATES PATENT OFFICE.

JOHN A. WILSON, OF CHICAGO, ILLINOIS.

IMPROVEMENT IN PROCESSES OF PRESERVING MEAT.

Specification forming part of Letters Patent No. 168,073, dated September 21, 1875; application filed June 25, 1875.

*To all whom it may concern:*

Be it known that I, JOHN A. WILSON, of Chicago, in the county of Cook and State of Illinois, have invented a certain Improved Process of Preserving Meats, of which the following is a specification:

This invention relates to the preservation of cooked meats in solid form in hermetical casing; and it relates more particularly to a novel method of compressing or solidifying the meat after it is in the case.

The invention consists in packing the meat, after it is cooked and relieved of bone and gristle, into preferably flat-sided tins, which, after being filled full of meat in a comparatively dry condition, without any added gravy or liquid, are then sealed up, and after sealing are heated, and subsequently, while still hot, punctured, so that the steam of the confined meat and the hot expanded gases will be suddenly ejected, and an approximate vacuum produced. The vent is then immediately closed, bringing an enormous atmospheric pressure to bear upon the outside of the tin, which collapses the flat sides of the vessel, and compresses the contained meat with a pressure approximating fifteen pounds to the square inch. This solidifies the meat much more effectually and simply than any artificial pressure can be made to do.

Meat so prepared will keep sound and sweet, and will come out of the can in a solid state fit to be sliced and eaten, with only sufficient moisture to render it tender and palatable.

In working this invention, I first cook and properly season the meat, and then pack it, reasonably dry and close, into flat-sided tin cans—using flat tins, or square or pyramidal tins, because the flat sides will not offer any material resistance to the collapsing pressure of the air, but will yield and transmit the pressure to the meat. When duly filled, the can is hermetically sealed by soldering it up, and then heated quite hot. Then a small hole is punctured through the tin and the expanded gases allowed to blow suddenly out, and the vent immediately soldered up. The ordinary atmospheric pressure thus brought to bear upon the exterior of the can collapses the flat sides, and accomplishes, without further aid, the desired solidification of the meat.

I prefer not to use cylindrical cans, because the cylindrical surface offers too great a resistance to the collapse, while the head of the can is stiffened too much by the opening loaded with solder, and commonly stamped with grooves. I prefer to use common tin, and have it perfectly plain and flat at all sides, so that it will readily yield.

I am well aware that various articles of food have been hermetically sealed in tins by first sealing the can containing the article, and then heating and puncturing and resealing; and I am also well aware that sardines and other fish have been preserved in square flat-sided tins hermetically sealed. My invention differs from all such in the fact that I pack the meat into the can until the can is full of meat, and employ no gravy, water, oil, or other liquid in conjunction with the article to be preserved, so that the pressure of the air upon the vessel will solidify the contents, and the meat will come out of the can in a fit condition to be sliced up for eating, and will be much less likely to spoil in keeping.

This improved process enables me to dispense with all machinery for pressing the meat. It also saves a considerable amount of handling of the meat, and consequently, besides saving labor, conduces to cleanliness.

Having thus fully described my invention, I claim as new and desire to secure by Letters Patent—

The above-described process of preserving cooked meat in a solid form—that is to say, cooking the meat, freeing it from bone and gristle, packing it comparatively dry, without gravy or added liquid, into a can of suitable form to collapse readily, until the can is full of meat, then sealing the can and heating it, and puncturing and resealing, substantially as specified.

JOHN A. WILSON.

Witnesses:
JOHN W. MUNDAY,
EDWD. S. EVARTS.